J. H. COBURN, dec'd,

G. DRAPER and E. A. THISSELL, assignees, by mesne assignments.

Shuttle for Looms.

No. 8,808. Reissued July 15, 1879.

Witnesses.

L. F. Connor

H. E. Whitney.

Inventor.

John H. Coburn, Assr to George Draper & Earl A. Thissell by Crosby & Gregory Attys

N. PETERS, PHOTO-LITHOGRAPHER, WASHINGTON, D. C.

UNITED STATES PATENT OFFICE.

GEORGE DRAPER, OF HOPEDALE, AND EARL A. THISSELL, OF LOWELL, MASSACHUSETTS, ASSIGNEES, BY MESNE ASSIGNMENTS, OF JOHN H. COBURN, DECEASED.

IMPROVEMENT IN SHUTTLES FOR LOOMS.

Specification forming part of Letters Patent No. 97,882, dated December 14, 1869; Reissue No. 8,808, dated July 15, 1879; application filed March 22, 1879.

DIVISION A.

*To all whom it may concern:*

Be it known that JOHN H. COBURN, late of Lowell, in the county of Middlesex and State of Massachusetts, but now deceased, invented certain new and useful Improvements in Shuttles for Looms, of which the following is a full, clear, and exact description, reference being had to the accompanying drawings, making part of this specification, in which—

Figure 1:
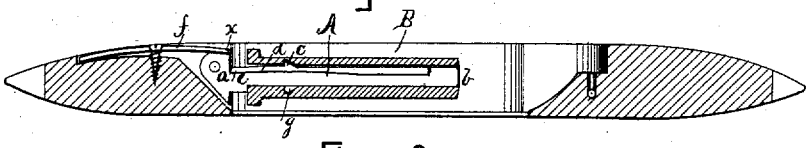
Figure 2:
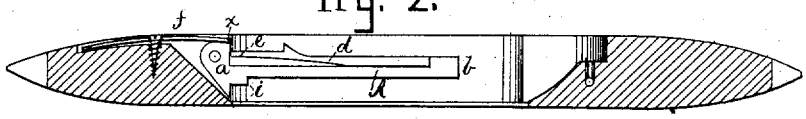
Figure 3:
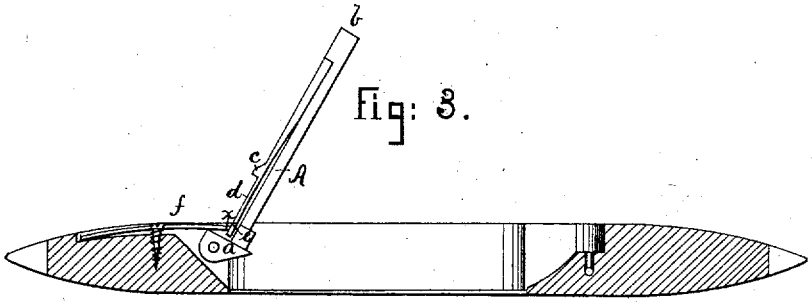
Figure 4:
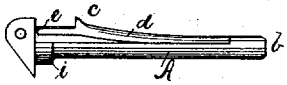
Figure 5:
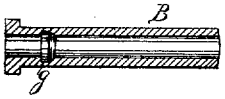

Figures 1 and 2 are central longitudinal sections of shuttles, the former figure representing a filling-bobbin on the spindle. Fig. 3 is a similar section, with the spindle in position to receive the bobbin or permit its removal if upon the spindle. Fig. 4 shows the spindle detached, its spring and holding-projection being clearly shown, and Fig. 5 shows in section the bobbin removed from the shuttle.

This invention and improvement in shuttles relates more especially to the spindle and the manner of holding the filling-bobbin, the object of the invention being to facilitate the removal of an empty bobbin and the replacing of a full one without unnecessary wear and injury to the bobbin; to hold the bobbin firmly on the spindle and parallel with the longitudinal central line of the shuttle by a holding-projection located within the bobbin, said holding-projection engaging a groove or projection in the interior of the bobbin, the usual external groove at the base of the bobbin and the usual spring-hook to engage the head of the bobbin externally being thereby rendered unnecessary.

By means of the spindle and holding-projection thereon, which enters the groove within the bobbin, there is no possibility of the bobbin being accidentally released or disengaged from the spindle while the shuttle is in use or while ready for use.

In this invention, (shown in the drawings,) the top side of the spindle A is flattened from the shoulder or head *a* to near its outer end, *b*, and the spring *d*, fitted and fastened to the flattened side of the spindle, so as to be turned with it, has a bobbin-holding projection, *e*, near one end. This spring *d* is so formed and held that its free end, *e*, provided with the bobbin-holding projection, is raised from the center of the spindle by its own rigidity, and considerable pressure is required to force it down and hold it while the bobbin is being placed upon the spindle or removed therefrom. The free end of the spring *d* is pressed down by contact with the end of the top plate or top spring, *f*, (shown in Fig. 3,) where the spindle is raised or turned upward to receive the bobbin, as it will be seen that when the spindle is turned upward or outward the free end of the spring *d* will come in contact with the under side of the end of the top plate or top spring, which bears upon the pivoted head of the spindle, and will press the spring *d* toward the center of the spindle, thereby releasing the projection *e* from the notch or annular groove *g* within the bobbin B, permitting it to be moved freely in a longitudinal direction upon the spindle. Turning the free end of the spindle downward into the shuttle releases the end of the spring *d* from contact with the end of the top plate, and allows the end of the spring *d* to so move as to insure the engagement of its projection with the groove within the bobbin. The spring *d* holds the bobbin steadily upon the spindle in the line of action of the shuttle, and prevents its rotation on the spindle when the filling runs off, while the projection *e*, entering the groove of the bobbin, retains it on the spindle, preventing the possibility of the bobbin being released or becoming disengaged from the spindle unless at the will and by the action of the operator, who may raise or turn the spindle and the bobbin upward, so as to bring the free end, *e*, of the spring *d* in contact with the end *x* of the top plate, *f*, which presses the spring *d* toward the center of the spindle, as shown in Fig. 3, when the bobbin may be removed and another bobbin replaced on the spindle with ease and convenience.

It will be observed by inspection of the drawings that the bobbin is held in position upon the spindle by the action of a holding-projection which enters a groove in the internal bore of the bobbin, and that the extreme head or base of the bobbin at its outer periphery is left cylindrical or smooth, and that the usual hooked spring common to other shuttles, such as were in use prior to this invention, to act within a groove extended about the head of the bobbin, is omitted, which omission is productive of numerous advantages.

My improvement can be readily applied to almost any kind of shuttle without the least change or alteration in the construction or application of any of the parts thereof.

Any other device may be arranged to compress the end of the spring *d;* but the end of the top plate is a convenient device for that purpose, and avoids the necessity of adding other parts to the shuttle.

The spindle has a stop, *i*, for the large or head end of the bobbin, so that the latter may be moved along the spindle just far enough to permit the groove *g* within the bobbin to arrive into position to be engaged and held by the projection *c*.

It will be noticed in this invention that the movement of the spindle and bobbin about the pivot of the spindle and out of the shuttle disengages the projection from the groove in the interior of the bobbin, leaving the bobbin free to be drawn from the spindle.

We claim—

1. A shuttle-spindle combined with a spring provided near its free end with a bobbin-holding projection, shaped, located, and adapted to enter a groove within the interior of the bobbin at its base, substantially as described.

2. A shuttle-spindle and a bobbin-holding projection co-operating therewith, adapted to enter a groove within the interior of the bobbin, combined with the shuttle-body, and means, substantially as described, to disengage the said projection from the bobbin when the spindle is raised from the shuttle, substantially as set forth.

3. The shuttle-body, combined with the pivoted spindle and a spring provided near its free end with a bobbin-holding projection, shaped, located, and adapted to enter an annular groove within the base of the bobbin and retain it upon the spindle when the latter is turned within the body of the shuttle, substantially as described.

4. A shuttle-spindle provided with a stop to determine the movement of the bobbin toward the pivotal point of the spindle, and with a yielding projection to engage a groove within the interior of the bobbin.

GEORGE DRAPER.
EARL A. THISSELL.

Witnesses:
G. W. GREGORY,
N. E. WHITNEY.